United States Patent [19]

Woo et al.

[11] 4,317,134

[45] Feb. 23, 1982

[54] METHOD AND APPARATUS FOR PATTERN NOISE CORRECTION

[75] Inventors: Nea-Yea Woo, Penfield; Teh-Hsuang Lee, Webster, both of N.Y.

[73] Assignee: Eastman Kodak Company, Rochester, N.Y.

[21] Appl. No.: 149,088

[22] Filed: May 12, 1980

[51] Int. Cl.³ .......................... H04N 3/14; H04N 5/30
[52] U.S. Cl. ...................................... 358/213; 358/167
[58] Field of Search ........................ 358/163, 167, 213

[56] References Cited

U.S. PATENT DOCUMENTS

| | | | |
|---|---|---|---|
| 3,800,078 | 3/1974 | Cochran | 358/213 |
| 3,800,079 | 3/1974 | McNeil et al. | 358/213 X |
| 3,877,056 | 4/1975 | Bailey | |
| 3,949,162 | 4/1976 | Malueg | 358/213 X |
| 4,237,488 | 12/1980 | Takemura | 358/163 |

OTHER PUBLICATIONS

SMPTE Journal, vol. 87, No. 4, pp. 209–213, Apr. 1978.

Primary Examiner—Robert L. Richardson
Attorney, Agent, or Firm—Thomas H. Close

[57] ABSTRACT

Fixed pattern noise manifested as percentage variations between the apparent sensitivities of sensor elements in a solid state image sensing array is reduced by removing one or more percentage portions of charge from a charge packet generated by an element of the sensing array. In a preferred embodiment, a percentage portion of charge is removed by dumping the portion of charge appearing under one part of a split electrode in a charge coupled device (CCD) shift register. A programmed memory controls the operation of the split electrode CCD device to provide the required corrections. To program the memory, the output of the image sensing array is measured with a non-image-wise input; and a particular charge packet size (e.g. the smallest useable charge packet produced by the array) is chosen as a reference. The percentage corrections required to adjust the relative sizes of the other charge packets from the array to make them equal in size to the reference charge packet are calculated and converted to corresponding control signals for the split electrode CCD device. The control signals are then stored in the memory. During subsequent operation of the image sensing array, the size of a charge packet is adjusted in the split electrode CCD shift register, under control of the control signals stored in the memory, to remove fixed pattern noise.

11 Claims, 23 Drawing Figures

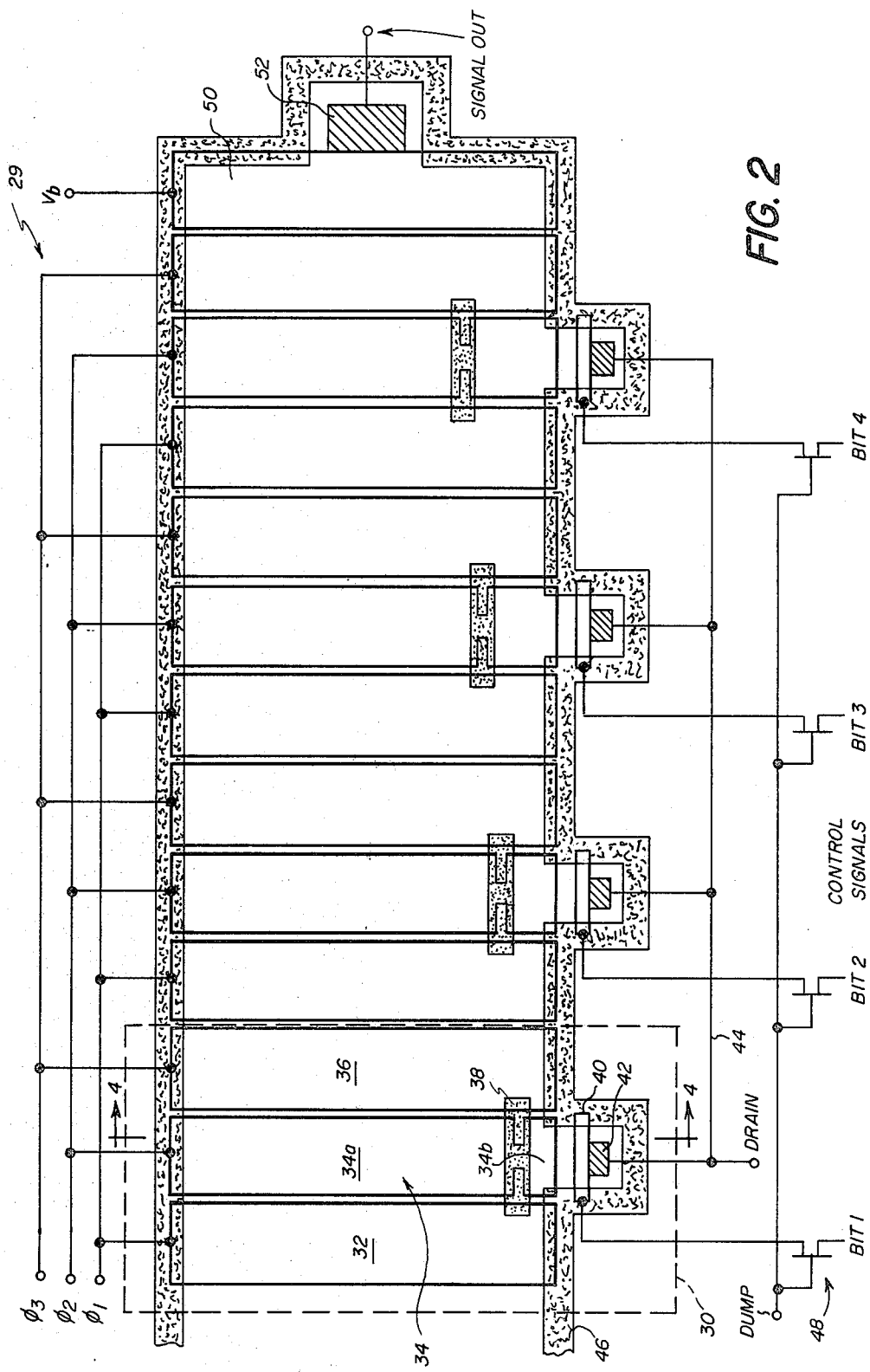

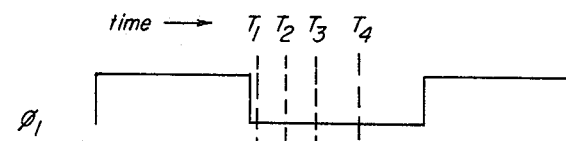
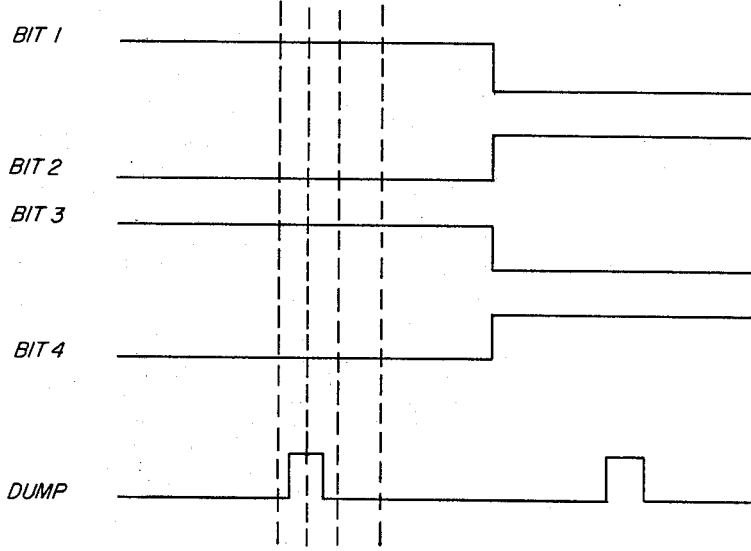

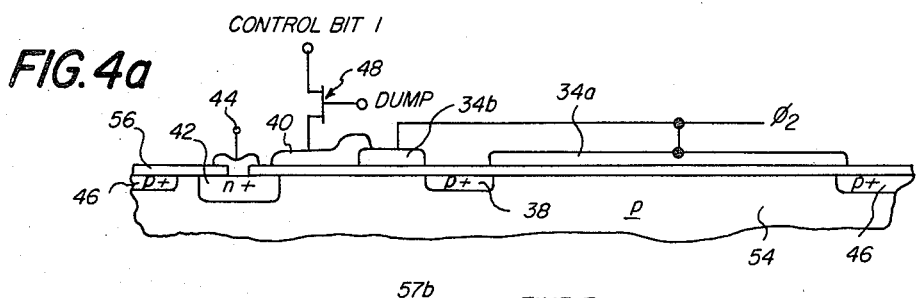
FIG.4a
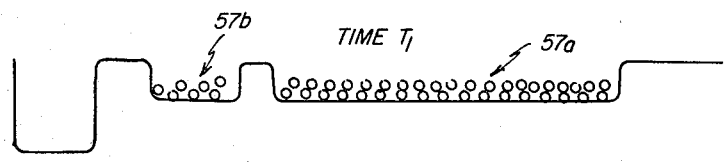
FIG.4b
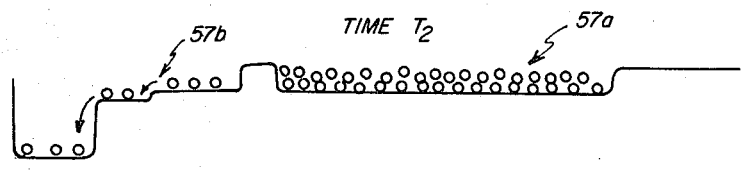
FIG.4c
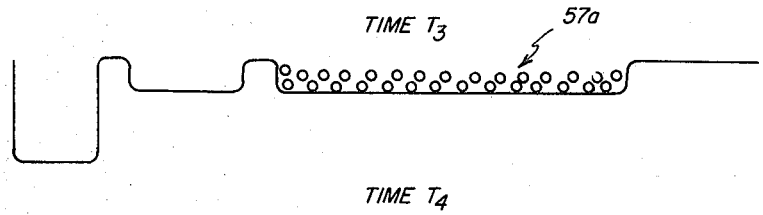
FIG.4d
FIG.4e

TIME $T_1$

TIME $T_2$

TIME $T_3$

TIME $T_4$

METHOD AND APPARATUS FOR PATTERN NOISE CORRECTION

BACKGROUND OF THE INVENTION

1. Field of the Invention

This invention relates to a method and apparatus for removing fixed pattern noise from a signal produced by a solid state image sensing array, and more particularly to removing fixed pattern noise of the type manifested as a fixed percentage deviation between the apparent sensitivities of the sensor elements in the array.

2. Discussion Related to the Problem

An image sensor comprised of an array of solid state sensor elements produces a signal composed of a train of pulses. The magnitude of each pulse represents the size of the charge packet produced by the corresponding sensor element in the array. Generally, the signals from such arrays are subject to two types of pattern noise. One type of pattern noise, caused, for example, by dark current in a sensor, results in a charge packet size bearing little or no relation to the actual amount of light that fell on the sensor element. A second type of pattern noise is manifested as a percentage variation in the apparent sensitivity of an element compared to the sensitivities of other elements. Such percentage variations are caused by manufacturing tolerances in the physical dimensions of the elements, or variations in transparency of electrodes from element to element. Apparent sensitivity variations may also result from non-uniform, non-imagewise illumination. Another source of pattern noise of this second type is non-uniformities in a color filter array disposed over the array to render the array sensitive to color information.

In the prior art, fixed pattern noise of the second type noted above has been corrected by making a predetermined percentage change to a signal representing the size of charge packet. See SMPTE Journal, April 1978, Vol. 87, No. 4, "An Experimental Telecine Using a Line Array CCD Sensor" by I. Childs and J. R. Sanders, p. 209-213. In the apparatus employed by Childs and Sanders, the percentage adjustment of a signal is accomplished by premeasuring the output of a sensor under non-imagewise input conditions. A first digital signal representing the logarithm of the magnitude of the charge packet produced by the sensor is generated and stored in memory. During normal operation of the device, i.e. with an imagewise input, the logarithm of the magnitude of the charge packet produced by the sensor is subtracted from the first digital signal using digital circuitry. The signal representing the remainder, after the subtraction, is converted from digital to analog form and when suitably amplified, used as the corrected signal. This process effectively normalizes all of the signal magnitudes to remove any percentage variations in apparent sensitivity from sensor to sensor. However, the digital-to-analog and analog-to-digital conversions and the log and antilog computations involved in this process require complex electronic circuitry. Furthermore, the computations and conversions introduce rounding errors that contribute to the noise level of the final signal. Also, operations on the signal are performed after the charge packet produced by the sensor has been read out of the sensor, by which time noise of other types such as clock feedthrough has been introduced into the signal.

Thus, the problem to be solved is one of providing a relatively simple and efficient method and apparatus for correcting fixed pattern noise of the percentage variation type in the output of a solid state sensor.

SOLUTION—SUMMARY OF THE INVENTION

According to the invention, fixed pattern noise, manifested as percentage variation in the apparent sensitivities of sensor elements in a solid state image sensing array, is corrected by removing proportional parts of charge from selected charge packets produced by the array. In a preferred embodiment, the proportional parts of the charge packets are removed by a split electrode CCD shift register having a special arrangement for selectively dumping the charge residing under one or more portions of a split electrode. Control of the split electrode CCD shift register is performed by a memory containing control signal information for each charge packet.

To program the memory, the output of the image sensing array is measured under non-imagewise input and a particular charge packet size (e.g. the smallest charge packet produced by the array) is chosen as a reference. The percentage corrections required to adjust the relative sizes of the other charge packets from the array are calculated and the required corrections, converted to control signals, are stored in the memory. In operation, the size of a charge packet produced by the array is adjusted by the split electrode CCD shift register under control of the associated stored program control signal.

BRIEF DESCRIPTION OF THE DRAWINGS

The invention will be described with reference to the accompanying drawings, wherein:

FIG. 2 is a schematic diagram showing a preferred embodiment of the electrode structure of a split electrode CCD pattern noise corrector according to the present invention;

FIGS. 3A-E are timing diagrams showing the clock signals and control signals used for operating the pattern noise corrector shown in FIG. 2;

FIGS. 4A-E are qualitative diagrams illustrating a cross-section of the potential profile under a split-electrode taken along line 4—4 (at selected time during operation) in the noise corrector shown in FIG. 2;

DESCRIPTION OF THE PREFERRED EMBODIMENT

Figure 1:
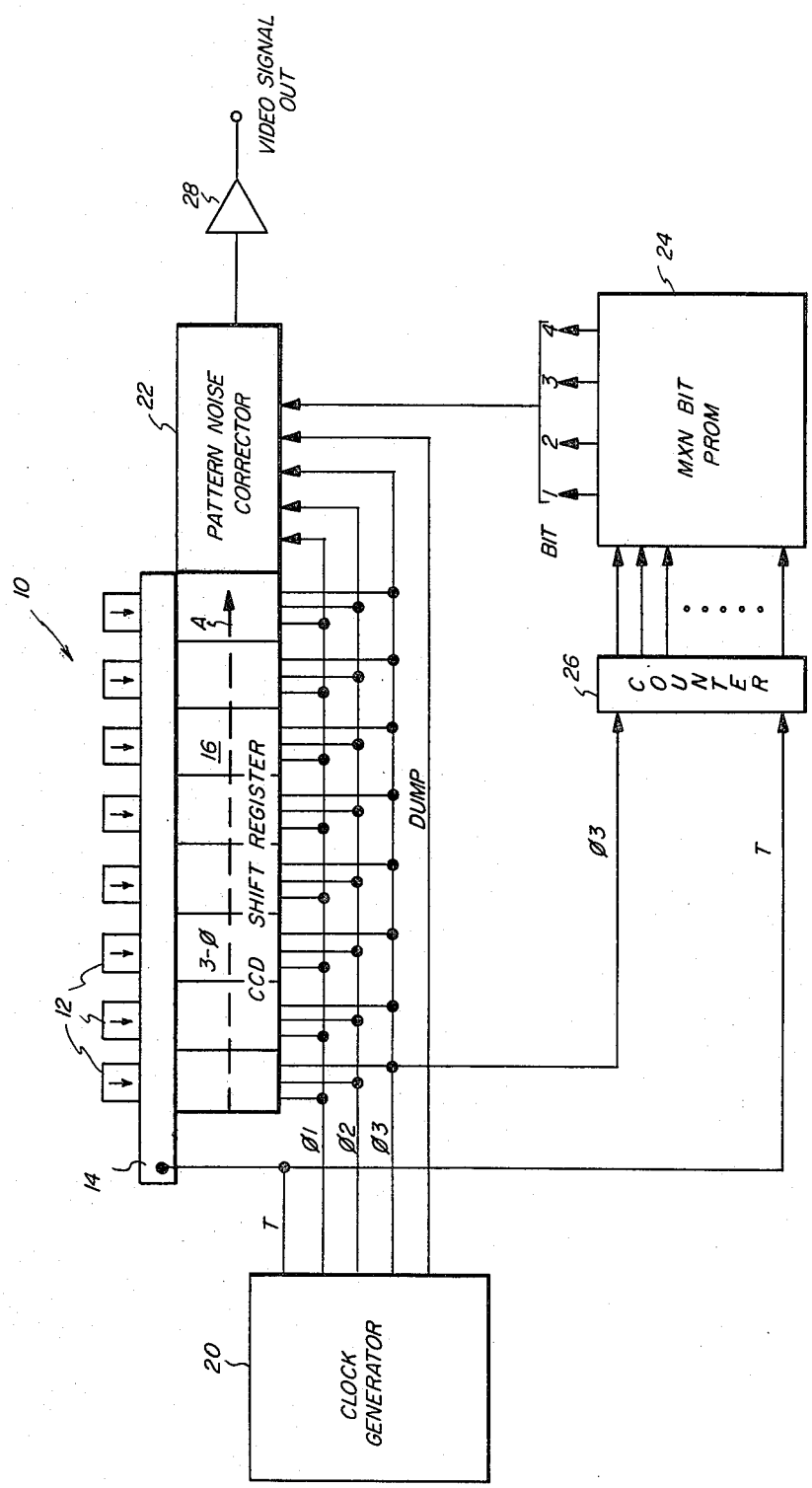
FIG. 1 is an overall schematic diagram showing an image sensor and a pattern noise corrector according to the present invention.

FIG. 1 shows a solid state image sensor in combination with a pattern noise corrector according to the present invention. The image sensor, generally designated 10, includes a linear array of photosensing sites 12 which are adapted to be exposed to imagewise light, all other parts of the device are shielded from light. The photosensing sites comprise, by way of example, a row of MOS photocapacitors or photodiodes fabricated on a silicon substrate by employing well-known integrated circuit techniques. A transfer gate 14 couples the photosensing sites with a three-phase charge coupled device (CCD) shift register 16. For examples of such image sensing arrays and the construction and operation of CCD shift registers in general, see Sequin and Tompsett, *Charge Transfer Devices*, Academic Press, 1975. Each of the photosensing sites 12 is associated with one stage of the shift register 16. Photocharges generated in photosensing sites 12 are transferred in parallel to the charge coupled shift register via transfer gate 14 and shifted in series through the shift register in the direction of arrow A by the application of a three-phase clock signal ($\phi_1$, $\phi_2$, $\phi_3$) supplied from a clock generator 20. Clock generator 20 also generates a transfer signal T which is applied to transfer gate 14.

Immediately adjacent the last stage of the shift register 16 and integrated into the CCD shift register circuit, as a continuation thereof, is a pattern noise corrector 22 according to the present invention. Pattern noise corrector 22 receives charge packets from shift register 16 and removes predetermined percentages of the charge packets in response to control signals supplied by a programmable read-only memory (PROM) 24. PROM 24 is addressed by a recirculating counter 26 that is driven by the phase three clock signal ($\phi_3$) and reset by the transfer gate signal (T). A four bit correction signal is supplied to the pattern noise corrector each time the counter is advanced. The corrected video signal from pattern noise corrector 22 is amplified by an output amplifier 28 and the signal is supplied to further signal processing electronics in a conventional manner.

According to a preferred embodiment of the invention, the pattern noise corrector 22 comprises a split electrode charge coupled device (CCD) shift register, in combination with means for dumping proportional parts of the charge residing under a split electrode. A preferred arrangement of a split electrode CCD shift register for use with the present invention will now be described with reference to FIG. 2. As is well known in the art, a CCD shift register may be physically implemented on a bulk substrate of monocrystalline silicon. Output diodes and channel defining means are formed in the substrate (by diffusion, ion implantation or other means). An insulating layer (e.g. silicon dioxide) is disposed over the substrate, and conductive electrodes are formed on the insulating layer (see Sequin and Tompsett, supra). The split electrode shift register, generally designated 29 comprises a four-stage CCD shift register of which the first stage 30 is representative. Stage 30 comprises a phase-one electrode 32, a phase-two split electrode 34, and a phase-three electrode 36. Split-electrode 34 is divided into two parts, 34a and 34b, the two parts being separated by a channel stopping diffusion 38. Adjacent the edge of electrode portion 34b is a transfer electrode 40 and an output diode 42 connected to a drain line 44. A channel stopping diffusion 46 is disposed around the periphery of the split electrode shift register 29 and is a continuation of the channel stopping diffusion defining the lateral limits of CCD shift register 16 (see FIG. 1). As shown in FIG. 2, the channel stopping diffusion 46 detours around the end of the second-phase split-electrode 34 and output diode 42.

The bit 1 signal from PROM 24 is supplied to transfer electrode 40 through an FET gate 48. Gate 48 is controlled by a DUMP signal from clock generator 20. The second, third and fourth stages of the split-electrode shift register are similar to the first stage, the only difference being that the ratios between the split-electrode portions are different in each stage. At the end of the fourth stage is an output gate 50 to which is applied a constant bias voltage $V_b$. An output diode diffusion 52 is disposed immediately adjacent output gate 50.

When a charge packet is moved into a potential well formed by applying a voltage to a second-phase split electrode, for example electrode 34, the charge packet is divided into proportional parts determined by the ratio of the areas of respective electrode portions. For example, if electrode portion 34a represents 99% of the total area of electrode 34, 99% of the charge will reside in the potential well created under electrode portion 34a and 1% of the charge will reside under the potential well created by electrode portion 34b. If the potential under transfer electrode 40 is lowered while charge resides in the potential well created by electrode portion 34b, the percentage portion of charge residing under electrode portion 34b will flow into output diode 42 and thence to drain 44, thus removing a 1% portion from the charge packet.

In the preferred embodiment disclosed above, the correction capability of the first stage is 1%, the second stage 2%, the third stage 4% and the fourth stage 8%. Thus, a total correction of between 1% and 14.3% is possible in the four stage shift register. Note that the total correcton possible is less than 15% because successive percentage type operations are not additive, since once one percentage correction has been made, e.g. 1%, the next percentage correction is operating on less than 100% of the signal. This effect is minimal for small percentage corrections, and in any event may be readily accounted for and appropriate adjustments made in the desired correction. The bit patterns required to be produced by the ROM 24 as each charge packet is shifted through the pattern noise corrector are determined by the percentage correction required.

The program for the PROM 24 is determined by operating the sensor with a non-imagewise input. The pattern noise corrector is capable of removing the effects of variations in illumination intensity (in addition to actual variations in the sensitivities of sensor elements). For example, in a film scanner variations caused by non-uniformity in the light source or optics are removed in the following manner. The sensor is illuminated by the light source alone with no film in the scanner, i.e. in a non-imagewise fashion, the operated to produce an output containing variations in charge packet sizes. The resulting variations in charge packet sizes will be due not only to variations in sensitivity between sensor elements, but also to any non-uniformities in illumination. The sizes of the charge packets thus produced are sensed and stored and the sizes of the various charge packets are compared. One of the charge packets, for example, the smallest, is chosen as a reference. The percentage corrections required to make all the other charge packets equal to the reference are then calculated. Information representing the correction capability of the pattern noise corrector is employed in calculating the required corrections. If the variations in charge packet size exceed the correction capability of the split-electrode CCD shift register (e.g. greater than ~14% in the example above), and assuming that one desires not to increase the size of the noise corrector by adding additional correction stages, use of the correction capability of the shift register is optimized by selecting as a reference, the charge packet size that will center the range of corrections about the mean charge packet size produced by the array. With this approach, charge packets of a size smaller than the reference will receive no correction, and charge packets of a size larger than the maximum correctable size will receive the maximum correction. Some residual pattern noise might remain in the corrected signal, however, the corrector will be employed to its optimum effect in this manner.

Since each charge packet is shifted sequentially through the correction stages of the pattern noise corrector, the bit patterns stored as 4 bit words in the PROM will appear as shown below:

| WORD # | BITS | | | |
|---|---|---|---|---|
| 1 | $b_{11}$ | $b_{n,2}$ | $b_{n-1,3}$ | $b_{n-2,4}$ |
| 2 | $b_{21}$ | $b_{12}$ | $b_{n,3}$ | $b_{n-1,4}$ |
| 3 | $b_{31}$ | $b_{22}$ | $b_{13}$ | $b_{n,4}$ |
| 4 | $b_{41}$ | $b_{32}$ | $b_{23}$ | $b_{14}$ |
| , | , | , | , | , |
| , | , | , | , | , |
| n | $b_{n,1}$ | $b_{n-1,2}$ | $b_{n-2,3}$ | $b_{n-3,4}$ | where $b_{n,m}$ represents the correction bit sent to the mth stage of the pattern noise corrector for the nth charge packet. After counter 26 reaches word n, it automatically recycles to word 1 and continues to count to word m (in this case word 4) until the nth charge packet has been shifted through the pattern noise corrector 22. Transfer signal T resets the counter 26 to word 1 when the next line of charge packets are transferred to the CCD shift register 16. If the first charge packet produced by sensor array 10 (see FIG. 1) were to receive a 7% correction, bit $b_{1,1}$ would be set equal to 1, bit $b_{1,2}$ would be set equal to 1, bit $b_{13}$ would be set equal to 1, and bit $b_{14}$ would be set equal to 0. Admittedly, the total correction thus effected is not exactly 7%, since the total percentage correction effected is not exactly the sum of the successive percentage corrections. However, the deviation from the exact percentage correction desired is easily accounted for, and for relatively small percentage corrections, the deviations are small.

After the required bit patterns have been calculated, they are stored in the programmable read-only memory 24 and the sensing array may be operated in the normal manner in conjunction with the pattern noise corrector to produce a signal free from fixed pattern noise of the percentage deviation type.

FIGS. 3A–E illustrate the clock and control signals applied to the pattern noise corrector shown in FIG. 2. FIGS. 3A, B and C show the three-phase clock waveform that is applied to respective electrodes of the split electrode CCD shift register 29; FIG. 3D shows the control signals generated by the PROM for controlling the transfer electrodes; and FIG. 3E shows the DUMP signal that is applied to the respective FET dump gates. Two cycles of the three-phase clock waveform are shown in FIGS. 3A through 3C. During the first cycle shown, the control signals from the PROM are such as to enable stage 1 and stage 3 to dump their respective portions of charge. During a second cycle, control signals are such as to enable stage 2 and stage 4 to dump their charge portions.

The operation of the pattern noise corrector shown in FIG. 2, under control of the signals shown in FIGS. 3A–E, will now be described with reference to FIGS. 4A–E. FIG. 4A is a cross-section of stage 30 taken through the second phase electrode 34 along line 4—4 in FIG. 2. As shown in FIG. 4A, the split-electrode CCD is formed on a substrate 54 of p-type silicon. The channel stopping diffusion 46 and 38 are doped p+, and the output diode 42 is doped n+. An insulating layer 56 of silicon dioxide is disposed over the substrate in a known manner. Conductive electrodes 40 and 34a and b and the contact of diode 42 are formed from doped polysilicon or aluminum in a known manner. FIG. 4B illustrates the potential profile in the apparatus at a time $T_1$. Time $T_1$, as indicated in FIGS. 3A–E, is a time just after a charge packet 57 has been shifted under electrode 34; and the charge packet has been divided into its proportional parts 57a and 57b. At time $T_2$ (see FIG. 4C) the signal representing control bit 1 is supplied to the transfer electrode 40 via FET gate 48, thereby causing the potential profile under transfer electrode 40 to lower and allow the proportional part 57b of the charge packet to flow into output diode 42. At time $T_3$ (see FIG. 4D) the signal representing control bit 1 has been removed from the transfer electrode 40 and the remaining portion of the charge packet 57a is ready to be shifted from electrode 34 to electrode 36. At time $T_4$ this shift has taken place; no more charge resides under electrode 34. The process described above is repeated in each stage of the CCD shift register, removing a proportional part of the charge packet whenever the control signal from PROM 24 is applied to transfer electrode 40 as charge packets are moved toward output diode 52.

Although a linear sensor array has been described, the pattern noise corrector may be used equally well with an area sensor array by providing a read-only memory with a correction bit pattern for each sensor element in the area array.

Figure 5:
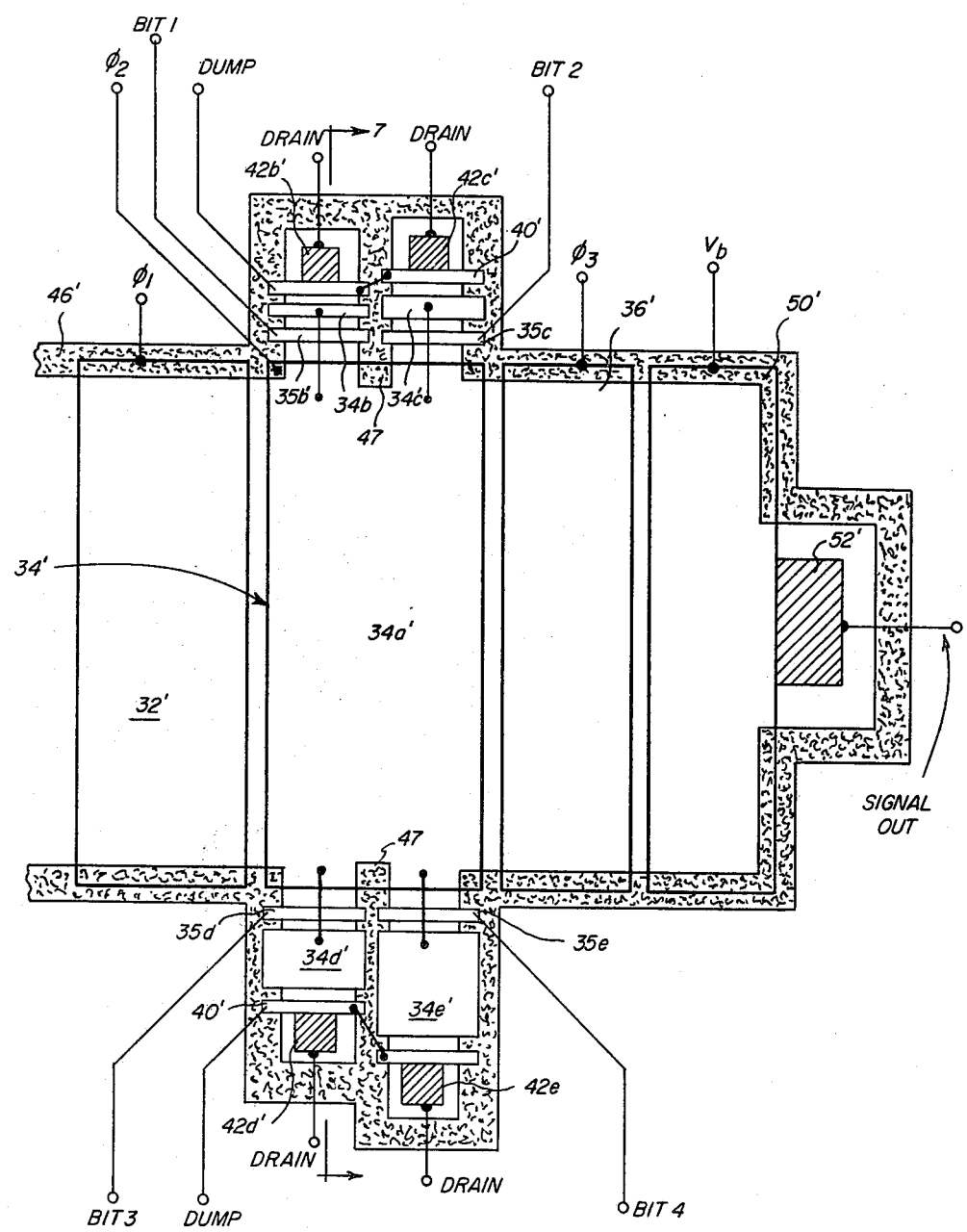
FIG. 5 is a schematic diagram showing an alternative embodiment of a split electrode CCD pattern noise corrector according to the present invention.

An alternative embodiment of the split-electrode CCD shift register 29 is shown in FIG. 5. The shift register shown in FIG. 5 comprises a single stage wherein all percentage corrections are effected simultaneously. Elements similar to the elements of the CCD shift register shown in FIG. 2 are similarly numbered with primes in FIG. 5. The total percentage correction of a charge packet is performed in a single step under split electrode 34'. The split electrode is proportioned into five parts: 34a' comprising the main body of the electrode, 34b' comprising a 1% portion, 34c' comprising a 2% portion, 34d' comprising a 4% portion and 34e' comprising an 8% portion. The percentage portions 34b', 34c', 34d' and 34e' are separated from the main electrode portion 34a' by control gates 35b, 35c, 35d and 35e, respectively. Adjacent electrode portions are isolated from each other by extensions 47 of channel stopping diffusion 46'. Output diodes 42b' through 42e' are isolated from respective percentage electrode portions 34b' through 34e' by dump gates 40'. Respective control signals from the PROM 24 are applied to control gates 35b' through 35e'.

Figures 6A, 6B, 6C, 6D, 6E:
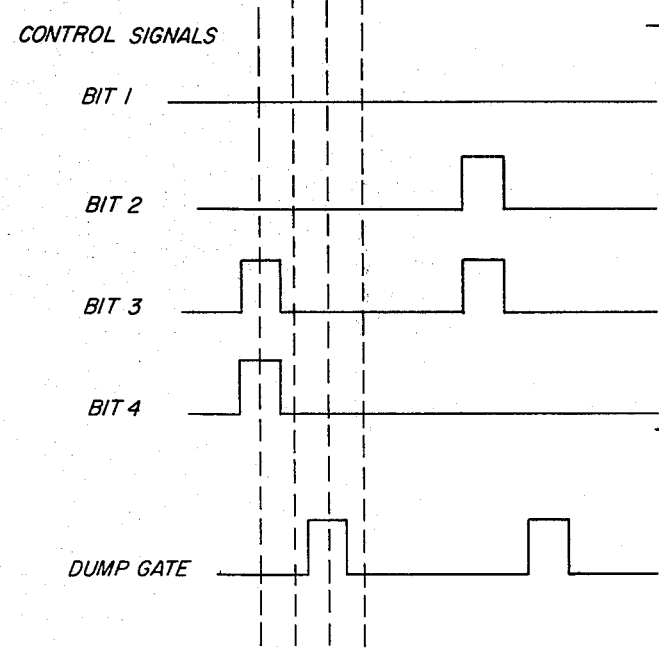
FIGS. 6A-E are timeing diagrams showing the clock signals and control signals used in operation of the pattern noise corrector shown in FIG. 5.
Figure 7A:
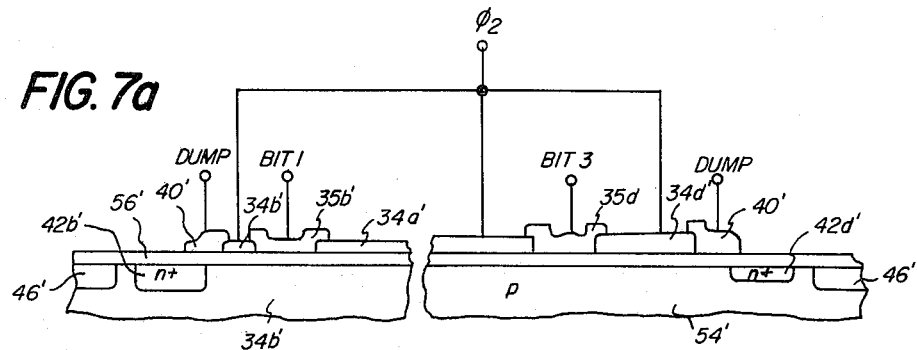
FIGS. 7A-E are qualitative diagrams illustrating a cross-section of the potential profile under a split electrode taken along line 7—7 (at selected times during operation) of the noise corrector shown in FIG. 5.
Figure 7B:
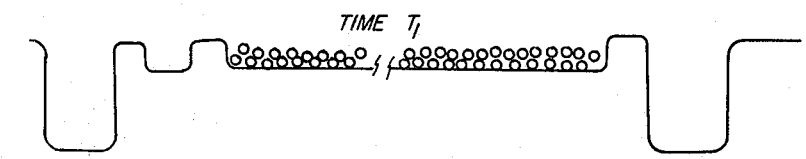
Figure 7C:
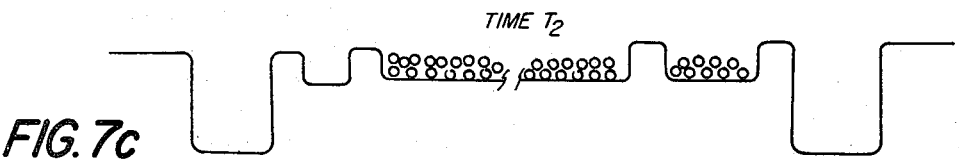
Figure 7D:
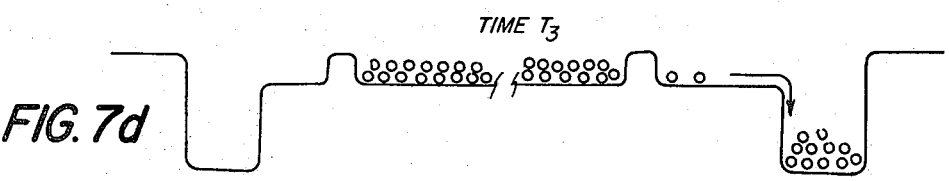
Figure 7E:
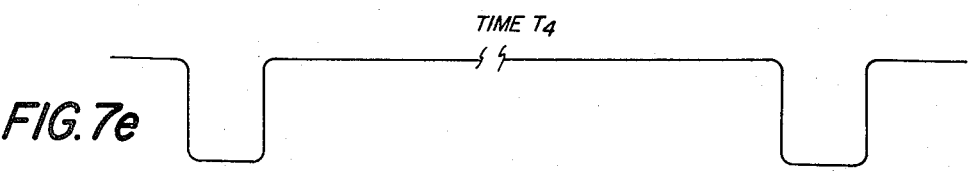

FIGS. 6A–E illustrate the clock and control signals applied to the pattern noise corrector shown in FIG. 5. The three-phase clock signals $\phi_1$, $\phi_2$ and $\phi_3$, shown in FIGS. 6A–C, are applied to electrodes 32', 34' and 36', respectively, in the normal manner. A bias voltage $V_b$ is applied to output gate 50' in a known manner. In the example shown in FIG. 6D, the first four-bit control signal supplied from the ROM to the control gates 35b–e represents a 12% correction since control bits 3 and 4 effect corrections of 4% and 8%, respectively.

The second four-bit control signal represents a 6% correction since control bits 2 and 3 effect corrections of 2% and 4%, respectively.

The operation of the pattern noise corrector shown in FIG. 5 under control of the signals shown in FIG. 6A–E will now be described with reference to FIGS. 7A–E. FIGS. 7A–E illustrate the potential profiles under the split electrode 34' taken along line 7—7 in FIG. 5. At a time $T_1$ (FIG. 7B) charge has been shifted under electrode 34'. Since the control signal (bits 3 and 4) applied to control gates 35d and 35e have lowered the potential under those control gates, the charge has distributed itself proportionally under electrode portion 34a', 34d' and 34e' (not shown). At time $T_2$ (FIG. 7C) the control signals are removed from the control gates and the portions of the charge packet residing under electrode portions 34d' and 34e' (not shown) are isolated from the main portion of the charge packet residing under electrode 34a'. At time $T_3$ (FIG. 7D) the potential under the dump gates 40' is lowered by the DUMP signal (see FIG. 6F), and the percentage charge packet portions separated from the main charge packet are swept away through output diodes 42d' and 42e' (not shown). At time $T_4$ (see FIG. 7E) the corrected charge packet is shifted from electrode 34' to electrode 36' and subsequently to output diode 52'. Since the total percentage correction of the charge packet has been effected in one step, the bit patterns stored as 4 bit words in PROM 24 (see FIG. 1) will appear as below:

| WORD # | BITS | | | |
|---|---|---|---|---|
| 1 | $b_{11}$ | $b_{12}$ | $b_{13}$ | $b_{14}$ |
| 2 | $b_{21}$ | $b_{22}$ | $b_{23}$ | $b_{24}$ |
| 3 | $b_{31}$ | $b_{32}$ | $b_{33}$ | $b_{34}$ |
| 4 | $b_{41}$ | $b_{42}$ | $b_{43}$ | $b_{44}$ |
| , | , | , | , | , |
| , | , | , | , | , |
| n | $b_{n,1}$ | $b_{n,2}$ | $b_{n,3}$ | $b_{n,4}$ |

The required correction bit pattern is generated in the same way as that described for the pattern noise corrector embodiment shown in FIG. 2. The sensor is operated with a uniform input, the output of the sensor is stored, and the required corrections are calculated. The correction bit pattern is then stored in the PROM 24 and the sensor and noise corrector are operated in the normal manner.

The invention has been described in detail with particular reference to certain preferred embodiments thereof, but it will be understood that variations and modifications can be effected within the spirit and scope of the invention. For example, in the embodiment of the split electrode CCD shift register shown in FIG. 2, each charge packet is automatically split into proportional parts as it is transferred to the $\phi_2$ electrode. Proportional parts are selectively dumped under control of the control signal from the PROM. In the embodiment shown in FIG. 5, each charge packet is selectively split into proportional parts, under control of the control signal from the PROM, after it has been transferred to the $\phi_2$ electrode. The proportional parts thus split off are automatically dumped. This approach of selectively splitting the charge packet then automatically dumping the split-off portions could likewise be applied to a multistage shift register. Similarly, the approach of automatically splitting the charge packet, then selectively dumping the split-off portions could likewise be applied to a single stage CCD shift register. It will be noted that with this latter configuration combinations of percentage corrections are strictly additive. It will also be noted that the split-electrode CCD device can be used to modulate a signal supplied to the CCD shift register. For example, a pulse train of equal size charge packets shifted through the split-electrode CCD device could be modulated by a pattern of control bits applied to the control electrodes, thereby providing, in effect, a digital-to-analog converter. The invention was described with reference to a three phase CCD, a one, two or four phase device could likewise be employed.

We claim:

1. A method for correcting fixed pattern noise of the type manifested as percentage variations in apparent sensitivity from element to element in solid state image sensing array, said method comprising the steps of:
    measuring the size of the charge packets produced by the elements in the array under the influence of a non-imagewise input of light;
    determining the percentage correction required to make the other charge packets substantially equal in size to a reference charge packet size;
    storing the percentage corrections;
    during subsequent normal operation, directly removing proportional parts of the charge packets produced by the elements according to the stored percentage corrections.

2. The invention as claimed in claim 1, wherein:
    said particular charge packet size is the smallest charge packet produced by the array and wherein said direct removal of proportional parts is effected by dumping a percentage portion of the charge from a charge packet by means of a split electrode CCD shift register.

3. The method claimed in claim 1, wherein:
    said percentage correction is limited to a predetermined maximum possible correction and wherein said reference charge packet size is chosen such that the range of corrections is centered about the mean charge packet size produced by the array.

4. Apparatus for correcting fixed pattern noise of the type manifested as percentage variations in apparent sensitivity from element to element in a solid state image sensing array, said apparatus comprising:
    signal storage means for storing a control signal representing the percentage correction required to correct the apparent sensitivity of an element;
    adjusting means for receiving a charge packet generated by an element of the image sensing array, and for directly removing a percentage portion of the charge packet in response to said control signal; and
    control means for coordinating the application of said control signal to said adjusting means.

5. The apparatus claimed in claim 4, wherein said adjusting means comprises: a split electrode CCD shift register including means for dumping the portion of a charge packet residing under one portion of a split electrode, and wherein said storage signals represent a percentage reduction in charge packet size required to make the apparent sensitivities of the element producing the charge packet equal to the apparent sensitivity of a reference element.

6. The apparatus claimed in claim 5, wherein said reference element is the element of the array having the minimum sensitivity of all the elements.

7. The apparatus claimed in claim 4, wherein
(a) said adjusting means is limited to a predetermined maximum percentage adjustment;
(b) said required percentage corrections exceed said maximum; and
(c) said reference sensitivity is chosen such that the range of corrections is centered about the mean sensitivity of the elements in the array.

8. Apparatus responsive to a control signal for effecting percentage wise changes in the size of charge packets in a charge-coupled device (CCD) shift register, comprising:
split electrode means in a stage of the CCD shift register for dividing a charge packet into proportional parts;
means for isolating the divided portions of the charge packet from each other; and
means for dumping one or more of the proportional parts of the charge packet.

9. Apparatus responsive to a control signal for making percentage wise changes in the size of charge packets in a charge coupled device (CCD) shift register, comprising:
split electrode means in a stage of the shift register for dividing a charge packet in proportional parts in response to the charge packet having moved thereunder;
channel stopping means disposed between said portions of said electrode means for isolating said proportional parts of said charge packet from each other;
drain means disposed adjacent a portion of said electrode means for carrying away the proportional part of the charge thereunder; and
dump gate means disposed between said electrode portion and said drain means, normally blocking charge from flowing into said drain and responsive to the control signal for allowing the proportional part of the charge to flow into said drain means.

10. Apparatus responsive to a control signal for making percentage wise changes in the size of charge packets in a charge coupled device (CCD) shift register, comprising:
split electrode means disposed in a stage of the shift register forming a main body portion of the electrode and one or more proportional parts;
gate means disposed between said main body portion and the proportional parts of said split electrode, responsive to the control signal for causing a proportional part of a charge packet to reside under one or more of said proportional parts of said split electrode;
drain means disposed adjacent a proportional part of said electrode means for carrying away a proportional part of a charge packet thereunder; and
dump gate means disposed between said proportional part of said electrode and said drain means normally blocking charge from flowing into said drain and responsive to a dump signal for allowing charge to flow into said drain.

11. Apparatus for correcting fixed pattern noise of the type manifested as percentage variations in apparent sensitivity from element to element in a solid-state image sensing array, comprising:
a semiconductor substrate having an insulating layer disposed thereon and a group of transfer electrodes disposed on said insulating layer to define a cell of a charge coupled device shift register, at least one of said electrodes being a split electrode defining a plurality of electrode portions having predetermined relative areas for dividing charge packets introduced thereunder into predetermined proportional parts;
means including multiphase clock pulse supply means connected to respective electrodes of said group defining said cell for serially shifting the charge packets generated by the solid state image sensing array through said cell of said charge coupled device;
means associated with said split electrode and responsive to a control signal for removing a percentage portion of a charge packet residing under one or more of said electrode portions; and
control means, including signal storage means for storing signals representative of a desired percentage correction relating to each charge packet, for applying said control signal to said removing means.

* * * * *